S. G. THOMSON.
REVERSING MECHANISM FOR LOCOMOTIVES.
APPLICATION FILED FEB. 16, 1915.

1,150,645.

Patented Aug. 17, 1915.
3 SHEETS—SHEET 1.

WITNESSES
R. A. Balderson
Geo. L. Robinson

INVENTOR
S. G. Thomson
by Bakewell, Byrnes Parmelee
Attys.

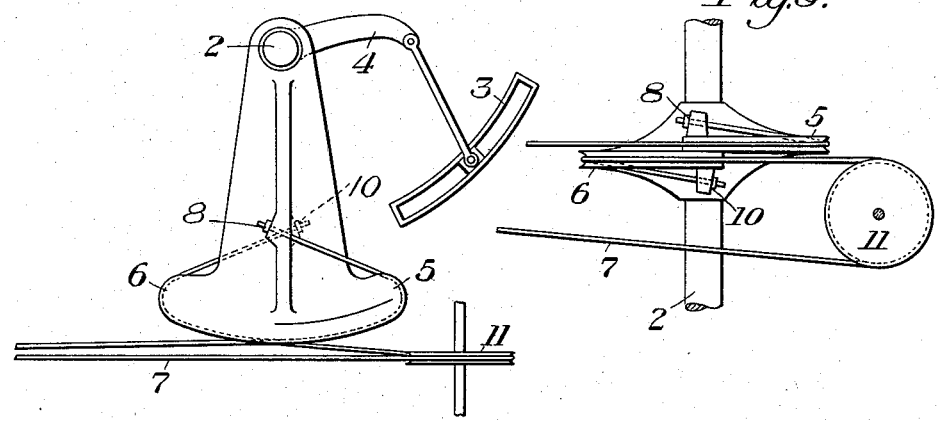

S. G. THOMSON.
REVERSING MECHANISM FOR LOCOMOTIVES.
APPLICATION FILED FEB. 16, 1915.
1,150,645.
Patented Aug. 17, 1915.
3 SHEETS—SHEET 3.
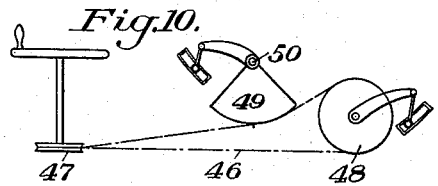
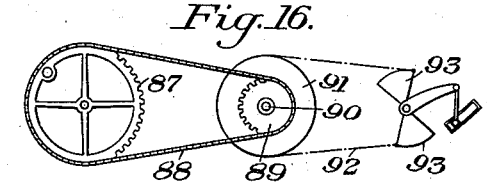
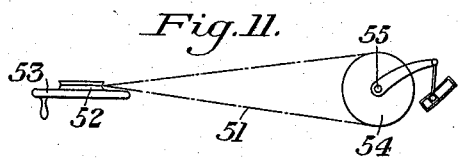
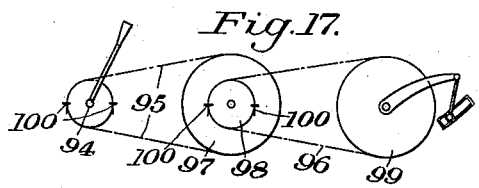
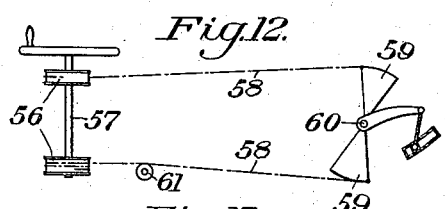
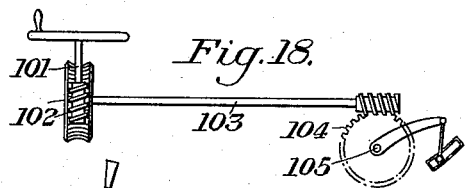
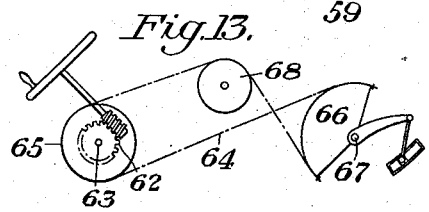
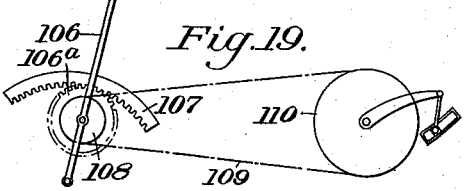
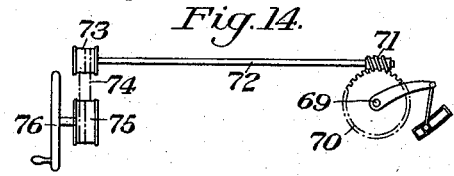
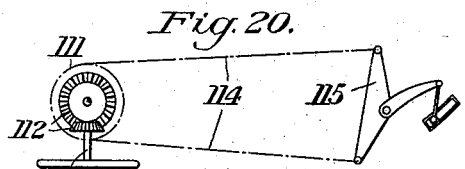
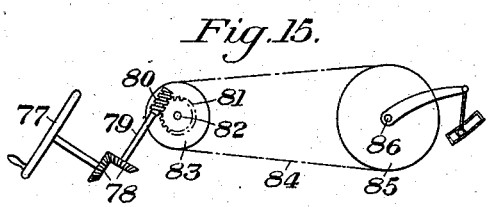
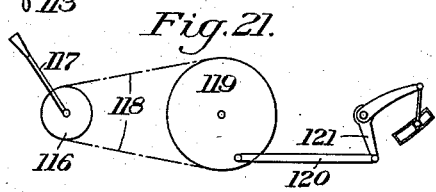
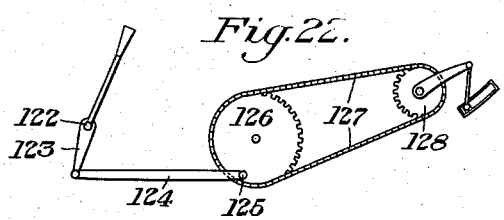
WITNESSES
R A Balderson
Geo. L. Robinson
INVENTOR
S. G. Thomson
by Bakewell, Byrnes Parmelee
Attys

UNITED STATES PATENT OFFICE.

SAMUEL G. THOMSON, OF READING, PENNSYLVANIA.

REVERSING MECHANISM FOR LOCOMOTIVES.

1,150,645. Specification of Letters Patent. Patented Aug. 17, 1915.

Application filed February 16, 1915. Serial No. 8,550.

*To all whom it may concern:*

Be it known that I, SAMUEL G. THOMSON, a citizen of the United States, residing at Reading, in the county of Berks and State of Pennsylvania, have invented a new and useful Reversing Mechanism for Locomotives, of which the following is a full, clear, and exact description, reference being had to the accompanying drawings, forming part of this specification, in which—

Figure 1:
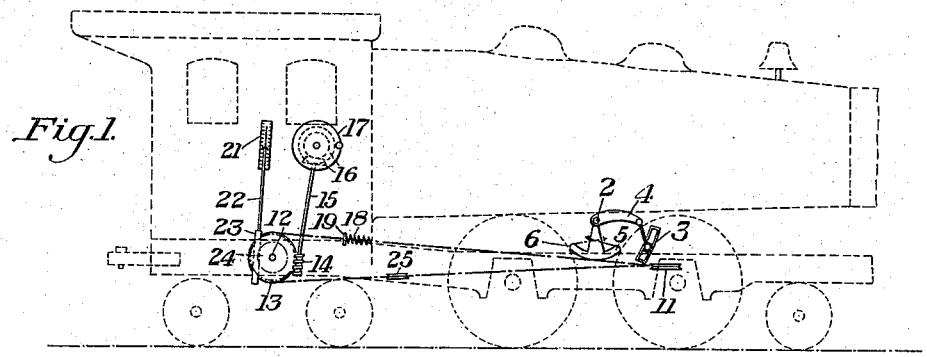
Figure 2:
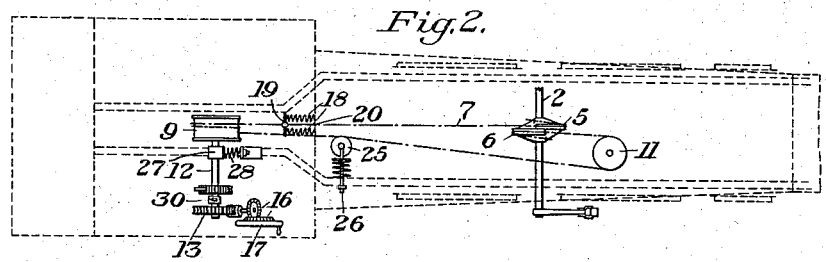
Figure 3:
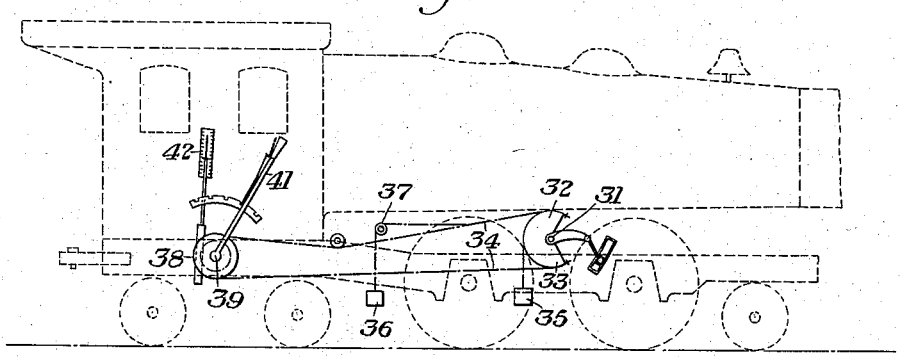
Figure 4:
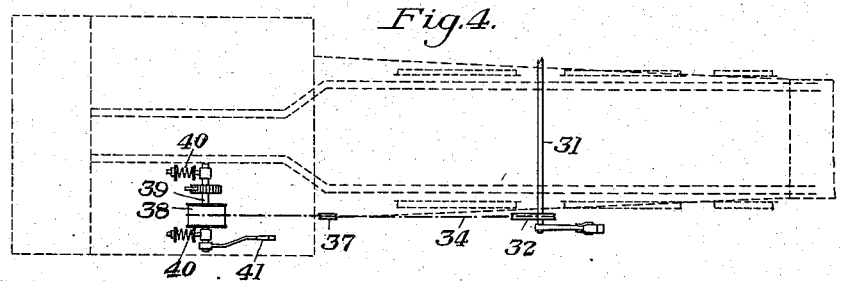

Figures 1 and 2 are, respectively, a side elevation and plan, largely diagrammatic, illustrating the application of one form of my invention to a locomotive. Figs. 3 and 4 are views similar, respectively, to Figs. 1 and 2, showing another embodiment of my invention. Fig. 5 is a detail sectional view of a preferred construction of the winding shaft. Fig. 6 is a section on the line VI—VI of Fig. 5. Fig. 7 is a detail sectional view of the indicator of Figs. 1 and 2. Figs. 8 and 9 are, respectively, an elevation and bottom plan of the composite reversing shaft lever of Figs. 1 and 2. Figs. 10 to 22, inclusive, are diagrammatic views, illustrating various other forms of the invention.

My invention has relation to reversing mechanism for locomotives, the main object being to provide a reversing mechanism which will be much lighter in its parts than the heavy extension rods and connections usually employed; and which will, at the same time, deliver to the tumbling or link-lifting shaft the force applied at the operating handle in the cab, preferably through flexible means such as cables, ropes, etc., in such a way that the rotation imparted to said shaft for a given movement of the operating handle through any portion of its operating arc will be through equivalent arcs. Also to provide a device of this character which will exert a uniform torque on the reversing shaft. These objects are obtained by a novel system of devices, preferably involving the use of a flexible tension member arranged to pull around the arc prescribed by the arms of the link-lifting or reversing shaft.

Referring first to that form of my invention shown in Figs. 1 and 2, the numeral 2 designates the link-reversing or tumbling shaft which is connected to the usual link mechanism 3 through any suitable connections such as shown at 4. Depending from the shaft 2 is a sector lever having the two arms 5 and 6 in different vertical planes, (see Figs. 8 and 9). 7 designates a cable, one end of which is adjustably attached to the arm 5 at the point 8 and passes thence around the grooved periphery of said arm and back to a winding drum or pulley 9. The other end of the cable 7 is adjustably connected to the arm 6 at the point 10 and passes around the grooved periphery of said arm in the opposite direction to the first named end portion of the said cable to and around a pulley 11, and thence back to the drum 9. The drum 9 is shown as mounted upon one end portion of a winding shaft 12, about midway of the width of the locomotive. Attached to the opposite end portion of said shaft is a reversing mechanism which, in these two figures, is shown as consisting of a worm gear 13 fixed to said shaft and engaged by a worm 14 on a shaft 15 connected by bevel gears 16 to a hand-operating wheel 17. 18 designate counterbalance springs attached to the cable 7 at 19 and also having a fastening at 20 to some rigid portion of the locomotive. The purpose of these springs is to counteract the eccentric weight of the reversing shaft 2 and the parts suspended therefrom. 21 designates an indicator for the purpose of showing the position of the engine valves. This indicator, which is located in the cab in full view of the engineman, is shown as connected by a shaft 22 (see Fig. 7) to a rack 23 whose teeth mesh with a pinion 24 on the winding shaft 12. 25 designates a guide pulley, any number of which may be employed to guide or change the direction of the cable 7, as may be necessary in any particular case. Pulley 25 is preferably mounted on an adjustable spring bracket 26 for the purpose of keeping the cable tight. The bearing 27 for the winding drum end of the shaft 12 is supported by a spring 28 which opposes the tension of the cable. Near its opposite end said shaft has another bearing 29 which is pivoted at 30 so that the shaft 12 may swing as the spring 28 compresses and releases.

This provides an adjustment for expansion and contraction and for taking up the stretching and wear of the cable. It will readily be seen that the rotation of the shaft 2 will be through equivalent arcs for any given movement of the operating handwheel 17 through any portion of its operating arc.

In the modification shown in Figs. 3 and 4 the mechanism is located along the side of the locomotive instead of its central portion, as in Figs. 1 and 2. The sector lever, which is secured to the tumbling shaft 31, has one of its arms 32 extending above, and its other arm 33 extending below said shaft. The respective ends of the operating cable 34 are connected to these two arms; and the two arms are also united to form a portion of a pulley circle to act as a lever arm for a counterbalance weight 35 which always acts tangentially from this lever arm circle. 36 is a supplemental counterbalance which passes around the pulley 37 and is connected to the upper branch of the cable 34 so as to have substantially the same counterbalance action as the springs 18 before described. The winding drum 38 for said cable is carried by a shaft 39 between two spring supported bearings 40. The springs of these bearings act to resist the cable tension and permit a certain amount of floating movement and freedom of alinement of the winding shaft. In these figures the reversing mechanism is shown diagrammatically as consisting of a hand lever 41 connected to the shaft 39. In practice the shaft 39 may be operated either directly or through any suitable gearing or connections. The ends of the cable 34 are preferably adjustably connected to the respective lever arms 32 and 33 so as to permit adjustment of the cable either to alter its tension or to change the relative position of the lever arms and the winding drum by tightening one cable and slackening the other. This adjustment may be used to set the indicator 42 (which is shown as connected to the shaft 39 in substantially the same manner as the indicator 21 is connected to the shaft 12 in the form first described) in exact relationship with the position of the arms 32 and 33, and which position, in turn, determines the cut-off of the steam valve. Obviously, the cable may be provided with any suitable adjusting means for this purpose.

Figs. 5 and 6 show essentially the winding shaft of Figs. 1 and 2, although in a somewhat more complete mechanical form. The shaft 12 is shown as carried inside of the tubular casing 12$^a$ which provides means whereby roller bearings may be employed, as indicated in Fig. 6. The gear wheel 24 is inclosed by another casing 12$^b$, which is securely fastened to one end of the casing 12$^a$, which in turn affords means for keeping the bearings in proper alinement and relation to each other, while permitting displacement of the casing as a whole. It is obvious that indicator gear and worm gear can be placed together and included in one casing. 12$^c$ in this figure indicates gearing for actuating the indicator.

Fig. 7 shows more in detail a mechanical construction which may be employed for the indicator of Figs. 1, 2, 3 and 4. In this figure 43 designates a spring which keeps the rack 23 in engagement with the pinion 24. The indicator 21 is shown as consisting of a slotted plate or case marked to represent inches of travel of the steam piston in the cylinder, with a pointer 44 connected to the rod 22 and operating in the slot 45 to show the point of cut-off of the steam valve relative to the position of the steam cylinder. I do not, however, limit myself to the particular form shown, since any suitable device of this character, connected in any suitable way to the moving parts of the reversing system in a way to give the desired indication, may be employed.

Fig. 10 shows the flexible connection 46 as passing between a pulley 47 on the winding shaft and a pulley 48 on a second shaft. The sectoral lever arm 49 on the reversing shaft 50 has the cable connected thereto at substantially its middle point, in order that rotation can be obtained in either direction from the central position.

In Fig. 11 the flexible member 51 passes over a pulley 52 secured directly to the operating wheel 53, and a pulley 54 on the reversing shaft 55; the operating planes of the two pulleys 52 and 54 being at right angles to each other, so that the cables leave the pulleys at an angle to their operating planes. It is apparent that the angularity of the operating planes of the two pulleys can vary anywhere between ninety degrees and a parallel position.

Fig. 12 shows two pulleys 56 mounted directly on the operating shaft 57, which in this case becomes the winding shaft. Each of these drums is connected by a cable 58 with one of two oppositely extending arms 59 on the reversing shaft 60. 61 is a guide pulley which gives the proper angle to the cable.

Fig. 13 shows a worm gear 62 for actuating the winding shaft 63, with a flexible member 64 connecting the drum 65 of the winding shaft to the sector 66 on the reversing shaft 67. 68 is a guide pulley which is used to cross the cables in the proper directions and prevent them from interfering with each other. This arrangement can be used to advantage where the space is occupied in the lower forward position of the reversing shaft circle.

Fig. 14 shows a construction in which the reversing shaft 69 carries a worm gear 70, driven by a worm 71 on a shaft 72. This shaft carries a pulley 73 driven by a cable 74 and a pulley 75 attached to the actuating wheel 76.

Fig. 15 shows the actuating wheel 77 as having its shaft connected by bevel gears 78 with a shaft 79 carrying the worm 80 which engages a worm wheel 81 on a shaft 82 carrying a pulley 83. Pulley 83 is connected by a cable 84 with a pulley 85 on the reversing shaft 86.

Fig. 16 shows a large sprocket wheel 87 attached to the operating wheel and driving a chain 88 which engages a sprocket wheel 89 on an intermediate shaft 90 carrying a pulley 91. A cable or cables 92 connect this pulley with sector arms 93 on the reversing shaft. This arrangement greatly multiplies the movement of the reversing shaft for a given movement of the operating handle, and increases the power exerted at the handle for a given power delivery to the reversing shaft. These changes in relative rotation and power delivered may be accomplished by flexible members, and there is little or no friction, compared to that which exists when the power is transmitted through gearing.

Fig. 17 shows a lever operated winding shaft 94 connected by cables 95 and 96 through intermediate pulleys 97 and 98 and with a pulley 99 on the reversing shaft. The sizes of the pulleys are such that the reverse conditions are obtained from that of the form shown in Fig. 16. That is, the movement of the reversing shaft is greatly reduced for a given movement of the operating handle; and the power required at the operating handle is also reduced for a given power to be delivered at the reversing shaft. Means such as indicated at 100 may be employed for adjusting the tension of the cables at their ends where attached to the drums or pulleys.

Fig. 18 shows an operating shaft 101 connected by a worm gearing 102 to a rigid shaft 103. The shaft 103 is in turn connected by worm gear 104 to the reversing shaft 105. In this form the movement is effected without the use of a flexible member.

Fig. 19 shows an operating lever 106 carrying a pinion 106ª, which, as the lever is moved, engages the teeth of an arcuate rack 107. The pinion, in turn, drives a drum 108 connected by a cable 109 to a pulley 110 on the reversing shaft. By employing different sizes and proportions of the operating lever, pinion, rack, and drums or pulleys, any desired increase or decrease in movement or in transmission of force can be imparted to the reversing shaft.

Fig. 20 shows a winding drum 111 driven by bevel gearing 112 from an operating shaft 113 and connected by flexible members 114 to the oppositely extending arms 115 of the reversing shaft. In this figure, the rotation of the reversing shaft is not uniform, on account of the transmission members not acting around the arc of the circle prescribed by the outer ends of the arms; but the arrangement embodies some of the advantages of my invention.

Fig. 21 shows a pulley or drum 116 actuated by the operating lever 117 and connected by a cable or cables 118 with a drum 119. This drum 119 has a rigid connecting bar 120 connected eccentrically thereto and to an arm 121 on the reversing shaft.

Fig. 22 shows an arrangement which is the reverse of Fig. 21, in that the operating shaft 122 has a lever arm 123 connected by a stiff transmission rod 124 to a point 125 on the sprocket gear 126 connected by chain 127 with the sprocket gear 128 on the reversing shaft.

The forms shown in Figs. 21 and 22 also do not embody the full advantages of my invention, but may be employed to advantage in certain cases.

The foregoing are only some of the many different possible embodiments of my invention, and illustrate the principal characteristics of the most desirable arrangements.

The usual method of operating reversing shafts is by means of stiff extension or reach rods, causing the revolving movement of the shaft to vary for a given movement of the operating handle. This variation reaches its maximum as the reach rod connection to the shaft passes over or under the top or bottom point of its arc. This also means that the maximum effort must be exerted in pulling or pushing the reversing shaft arm away from those positions approximating the dead centers. In the arrangements embodying my invention, the force required to be applied is always continuous in any position of the reversing shaft arm. This feature is of particular advantage in counterbalancing the reversing shaft, since a weight or a spring with a given tension or compression can be made to equalize the weight of the valve motion parts in any position of the reversing shaft. With the rigid reach rod method of operating, a counterbalancing device is necessarily too weak for one position of the reversing shaft, and too strong for the other position. The use of cables, therefore, in the reversing mechanism gives a very uniform method of operating the reversing shaft, and requires a minimum effort at the hand lever in the cab on account of the reduction or increase of the rotating speeds and the transmission of force being accomplished without the friction due to a continuous system of worm or bevel gearing. The flexible method of transmission also affords easy means for connecting the operating parts of the mechanism, since the parts need not be in perfect alinement to prevent binding, as is necessary where stiff connectors are used. This greatly facilitates the erection and maintenance of the parts of the mechanism, as well as affording ease of operation. By the provision of spring supported bearings for the winding drum or winding shaft, lost motion may be eliminated, and a minute movement of the operating handle in the cab means a corresponding movement of the steam valve. As will appear from the foregoing, the flexible connection can be also used as a link in a system of stiff connecting tension rods and shafts, the flexibility thus being introduced only where it is needed to accomplish the required result. The use of flexible connectors also greatly facilitates the design of a locomotive, since they can be carried around projections and intermediate parts by means of idler or carrier pulleys. In the case of stiff connectors, modifications of these parts are necessary, or else a complication of levers, gearing, bell-cranks, are required. A further advantage of the flexible connection is that expansion and contraction of the connecting cable does not cause any change in the relative positions of the operating handle and of the steam valve, such as occurs with the ordinary stiff reach rod. In my construction the cables pull oppositely to each other and expand and contract equally, and the change in length is taken up by the tension adjusting means. For this same reason the cab indicator can be relied upon for an exact reading of the relative positions of the steam valve and of the piston in the cylinder, unaffected by any expansion or contraction which may occur. The flexible connection also makes it possible to keep the main transmission cable attachments independent of any connection to the boiler, so that the relative expansion of the boiler and the locomotive frame does not affect the accurate operation of the transmission system.

The particular design and relation of the parts in any given instance will be governed by that which will give the best construction and arrangement for the particular type of locomotive to which the system is applied. The principle of uniform rotation is obtained by having the flexible member acting on a revolving part by passing around an arc of the pulley circle. Either the full circumference of pulleys or drums may be used, or only sectors of the same acting as a lever arm where the rotation is limited. In the latter, only so much of the complete circle is used as an arm as will include the arc necessary to form a continuous bearing for the flexible member while the shaft is rotating through its full movement. This feature, in connection with supplementary carrier pulleys, allows the arms of the reversing shaft to be operated in any direction, so that the axis of rotation of said shaft, as well as the link lifting arms attached thereto, can be located in any desired position irrespective of the transmission system.

While I have illustrated my invention as applied to a locomotive, I do not desire to restrict myself thereto, as it is also applicable for reversing the links of a stationary engine, especially when it is desired to control and operate such an engine from a distance.

It is obvious that any suitable form of flexible connection may be used, including cables, ropes, chains, belts, steel bands, sprocket chains, silent chains, etc.; and the terms "cable" and "flexible member" as used herein and in the appended claims are to be understood in this broad sense.

Wherever it is stated herein or in the appended claims that the mechanism or a portion thereof is attached to the locomotive boiler, such statement is intended to include the attachment to any portion of the locomotive which moves with the boiler as the latter expands and contracts. Thus, such mechanism may be attached to a bracket extending directly from the boiler or it may be attached to portions of the cab or cab brackets which are fastened to the boiler and move with it as it expands and contracts.

I claim:

1. In a locomotive, the combination with a link reversing shaft attached to the supporting frame of the locomotive, of operating mechanism attached to the locomotive boiler, and actuating connections between said mechanism and said shaft, said connections comprising a flexible member, substantially as described.

2. In a locomotive, the combination with a link reversing shaft attached to the supporting frame of the locomotive, of operating mechanism attached to the locomotive boiler, and actuating connections between said mechanism and said shaft, said connections comprising a flexible member, and a lever member having an arcuate face engaged and acted upon by the flexible member, substantially as described.

3. In a locomotive, the combination with a rotatable reversing shaft attached to the supporting frame of the locomotive and having an arm to lift a portion of the link motion of the locomotive, an operating handle attached to the locomotive boiler and located in the cab of the locomotive and arranged to move through an arc, and connecting means extending forwardly along the locomotive and comprising a flexible member; and means in connection with said member to effect the rotation of said shaft through equivalent angles for a given movement of the operating handle through any portion of its operating arc, substantially as described.

4. In a locomotive, the combination with a rotatable reversing shaft attached to the supporting frame of the locomotive and having an arm to lift a portion of the link motion, an operating handle attached to the locomotive boiler and arranged to move through an arc, and connecting means comprising a flexible member, and a system of gears and pulleys coöperating with said flexible member to effect the rotation of said shaft through equivalent angles for a given movement of the operating handle through any portion of its operating arc, substantially as described.

5. In a locomotive, the combination with a link reversing shaft attached to the supporting frame of the locomotive, of operating mechanism attached to the locomotive boiler, and actuating connections between said mechanism and said shaft, said connections comprising two flexible tension members connected to said shaft and to the operating mechanism, one of said tension members being operative to rotate said shaft in one direction and the other to rotate it in the opposite direction, substantially as described.

6. In a locomotive, the combination with a rotary reversing shaft attached to the supporting frame of the locomotive and having opposite lever arms formed with arcuate ends, of an operating mechanism attached to the locomotive boiler and comprising two flexible tension members engaging and acting upon the arcuate ends of said lever arms, substantially as described.

7. In a locomotive, the combination with a valve operating reversing shaft, of an indicator mechanism located in the cab of the locomotive, to show the relative position of said valve, and actuating connections between said mechanism and said shaft, extending forward from the cab, said connections comprising a flexible member operating around an arc, substantially as described.

8. A locomotive reversing mechanism having two revolving members attached together by flexible tension members extending around the periphery of at least a portion of each of said revolving members, one of said revolving members having a spring holding a bearing against the tension of said flexible tension members.

9. In a locomotive, a reversing mechanism having two opposed flexible tension members acting in opposite directions on a revolving member, and a counterbalancing weight or spring arranged to oppose the force of gravity of the link connections pulling against one of said tension members.

10. In a locomotive, a reversing mechanism having two opposed flexible tension members, to act in opposite directions on a revolving member, and means for applying a counterbalancing force opposing the gravity force of the link connections pulling against one of said tension members.

11. A locomotive reversing mechanism having two revolving members actuated by a flexible tension member holding them together, and means at at least one end of said flexible tension member for adjusting the tension of said flexible tension members.

12. In a locomotive reversing mechanism, two revolving members having their peripheries attached together by flexible tension members, and means at the ends of said flexible member for altering the distance between the points of attachment of the tension members to the peripheries of said revolving members.

13. A locomotive reversing mechanism having a tubular casing inclosing a rotating shaft and flexible fastenings, for attaching said casing to the locomotive, said fastenings being adapted to allow a relative movement between said casing and the part of the locomotive to which it is attached, substantially as described.

14. A locomotive reversing mechanism having a tubular casing inclosing a rotating shaft and flexible fastenings for attaching said casing to the locomotive.

15. In a locomotive reversing mechanism, a casing containing gears, a rotating shaft, and flexible fastenings for attaching said casing to the locomotive.

16. In a locomotive, a reversing mechanism having a worm gearing, a valve indicator attachment, and a winding drum, arranged in series on a revolving shaft.

17. In a locomotive, a reversing mechanism having a revolving shaft, a spur gear fastened to said shaft, and a valve-position-indicator operated by the rotation of said spur gear.

18. In a locomotive reversing mechanism, an indicator having a graduated scale to represent the steam cylinder length, and a marker, one of said members being operated by a spur gear fastened to a revolving shaft, so as to indicate, by their relative location, the point of cut-off of the steam valve.

19. A locomotive reversing mechanism having a winding dum attached to one end of a revolving shaft, and gearing attached to its other end, and an operating shaft and wheel connected to said gearing and a flexible member connecting said drum with the link reversing shaft of the locomotive.

20. A locomotive reversing mechanism having transmission members lying adjacent to a vertical longitudinal plane through the center of the locomotive, for the full length of the firebox.

21. A locomotive reversing mechanism having transmission members lying adjacent to a vertical longitudinal plane through the center of the locomotive, for the greater portion of the length of said members.

In testimony whereof, I have hereunto set my hand.

SAMUEL G. THOMSON.

Witnesses:
HARRY EGOLF,
J. I. RIST.